US009692528B2

United States Patent
Wang et al.

(10) Patent No.: US 9,692,528 B2
(45) Date of Patent: Jun. 27, 2017

(54) DEVICE, TERMINAL, METHOD AND STORAGE MEDIUM FOR IMPROVING RADIO FREQUENCY LINK RECEIVING AND TRANSMITTING PERFORMANCE

(71) Applicant: ZTE CORPORATION, Shenzhen, Guangdong Province (CN)

(72) Inventors: Zhenyu Wang, Shenzhen (CN); Chengzan Zhang, Shenzhen (CN); Yuqiang Lai, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 15/107,961

(22) PCT Filed: Jul. 16, 2014

(86) PCT No.: PCT/CN2014/082348
§ 371 (c)(1),
(2) Date: Jun. 24, 2016

(87) PCT Pub. No.: WO2015/096466
PCT Pub. Date: Jul. 2, 2015

(65) Prior Publication Data
US 2016/0323044 A1    Nov. 3, 2016

(30) Foreign Application Priority Data
Dec. 26, 2013  (CN) .......................... 2013 1 0733353

(51) Int. Cl.
*H04B 17/00*  (2015.01)
(52) U.S. Cl.
CPC ................ *H04B 17/0085* (2013.01)
(58) Field of Classification Search
CPC ............... H04B 17/0085; H04B 1/44
See application file for complete search history.

(56) References Cited

U.S. PATENT DOCUMENTS

2009/0232251 A1* 9/2009 Huang .................. H04B 17/21
                                                 375/295
2010/0158088 A1* 6/2010 Kim .................. H04B 17/0085
                                                 375/224
(Continued)

FOREIGN PATENT DOCUMENTS

| CN | 101090302 A | 12/2007 |
| CN | 201278522 Y | 7/2009 |
| CN | 102420634 A | 4/2012 |

OTHER PUBLICATIONS

International Search Report dated Oct. 10, 2014 in PCT Patent Application No. PCT/CN2014/082348.

*Primary Examiner* — Ping Hsieh
(74) *Attorney, Agent, or Firm* — Plumsea Law Group, LLC

(57) ABSTRACT

The present document discloses a device for improving receiving and transmitting performance of radio frequency link, comprising a radio frequency transmitting link, a radio frequency receiving link and a test link, wherein a first node is set between a power amplifier and a contact spring of first antenna in the radio frequency transmitting link, the first node is connected to a first on-off port of a radio frequency main switch in the test link; a second node is set between a receiving filter and a contact spring of second antenna in the radio frequency receiving link, the second node is connected to a third on-off port of the radio frequency main switch in the test link; and a second on-off port of the radio frequency main switch in the test link is connected to ground via a resistor.

20 Claims, 7 Drawing Sheets

(56) References Cited

U.S. PATENT DOCUMENTS

| | | | |
|---|---|---|---|
| 2010/0248641 A1* | 9/2010 | Schumacher | H04B 7/0689 455/67.14 |
| 2010/0321233 A1* | 12/2010 | Ben-Zur | H01Q 3/267 342/174 |
| 2013/0260699 A1* | 10/2013 | Fernando | H04B 17/24 455/79 |
| 2014/0219144 A1* | 8/2014 | Najatian | H04B 7/2643 370/280 |
| 2014/0256268 A1* | 9/2014 | Olgaard | H04B 17/00 455/67.13 |

* cited by examiner

DEVICE, TERMINAL, METHOD AND STORAGE MEDIUM FOR IMPROVING RADIO FREQUENCY LINK RECEIVING AND TRANSMITTING PERFORMANCE

CROSS-REFERENCE TO RELATED APPLICATION(S)

This application is the U.S. National Phase application of PCT application number PCT/CN2014/082348 having a PCT filing date of Jul. 16, 2014, which claims priority of Chinese patent application 201310733353.8 filed on Dec. 26, 2013, the disclosures of which are hereby incorporated by reference.

TECHNICAL FIELD

The present document relates to performance management technology of radio frequency links in a mobile terminal, in particular to a device, a mobile terminal, a method and a storage medium for improving receiving and transmitting performance of a radio frequency link.

BACKGROUND OF RELATED ART

With the high-speed development and deep popularization of wireless communication technology, users have already been able to deeply feel wireless mobile life styles brought by high speed and convenience of high technology. Mobile terminal products such as function phones, smart phones, data cards and portable WiFi hot spots oriented to the users have been widely popularized and used.

Mobile communication experiences a long development and evolution process from 2G to 3G and from 3G to 4G. At present, Long Term Evolution (LTE) networks are being comprehensively popularized and all countries have carried out large-scale network construction. As a standard technology of 4G mobile communication technologies, LTE introduces key transmission technologies such as the Orthogonal Frequency Division Multiplexing (OFDM) technology and Multiple-Input Multiple-Output (MIMO) antennas, which effectively increase the spectrum efficiency and data transmission rate Under a Cat3 technical specification frame, a peak rate of the LTE technology can reach to 50 Mbit/s on uplink and 100 Mbit/s on downlink, and various bandwidth allocation such as 1.4 MHz, 3 MHz, 5 MHz, 10 MHz, 15 MHz and 20 MHz is supported. Thus, the spectrum allocation can be more flexible and the system capacity and coverage are obviously improved. LTE wireless network architecture is more flattened, the system time delay is reduced, the network construction cost and maintenance cost are reduced, and interoperation with a 3rd Generation Partnership Project (3GPP) system can be supported.

The Time Division-Long Term Evolution (TD-LTE) technology is an important branch in 4G, and corresponds to Frequency Division Duplexing-Long Term Evolution (FDD-LTE) technology. Different from FDD-LTE uplink and downlink functions which work at paired symmetrical frequency bands, uplink and downlink functions of TD-LTE are realized by using the same frequency band, and thus the utilization rate of resources can be improved. In addition, during actual use of TD-LTE, by adjusting uplink and downlink frame structure proportions according to actual needs of users, the utilization rate of LTE networks and system resources is improved and the flexibility is higher.

However, most Power Amplifiers (PA) used by mobile terminals at present are single-chip integrated amplifiers, and an input/output matching network, a direct-current biasing circuit and an amplifier tube core are integrated on a very small chip using GaAs as a substrate. Although this kind of power amplifiers has the features of small volume, light weight, high reliability, low cost and the like, and can exempt a user from designing an input/output matching network and a static working point and thus design time is saved, since an inductor L and a capacitor C in the matching network respectively consist of a gold wire and a gold foil, the tolerable power is comparatively small; and due to the small volume, the direct-current consumption power is comparatively large, the thermal resistance from the tube core to an element surface is large and consequently heat emission is comparatively serious. As a result, the maximum output power of this kind of power amplifiers is about 28-30 dBm and it is difficult to reach higher output power; and in consideration of 1 dB compression point factor, the actually usable output power of this kind of power amplifier is only about 27-29 dBm.

In addition, in countries and regions in which 4G networks have been constructed or are under construction, with respect to actual requirements of operators on mobile terminals, besides referring to standards and specifications that are made by 3GPP, related standards and specifications are also made according to factors in multiple aspects such as network deployment features and actual user demands in the countries and regions, wherein a very important factor is an Over The Air (OTA) index of shielding darkrooms of the mobile terminals, including Total Radiated Power (TRP) and Total Isotropic Sensitivity (TIS). This index has a direct relationship with actual user experience and is an important standard for selecting mobile terminal products by the operators. In a general sense, on the premise that the conducted power and receiving sensitivity specified by 3GPP are reached, it is expected to have higher TRP and TIS.

At present, there are two ways to improve TRP, wherein one way is to, when the power from a radio frequency link to an antenna port is fixed, debug an antenna to enable it to have higher radiating efficiency, such that TRP can be improved; and the other way is to, when the radiating efficiency of the antenna is fixed, increase output power of the radio frequency link or decrease link insertion loss such that TRP can also be improved. Comparatively, after the antenna design is finalized, it is an easier and simpler measure to adjust the output power of the radio frequency link.

With respect to the improvement of TIS, similarly there are two ways, wherein one way is to, when receiving sensitivity from the radio frequency link to the antenna port is fixed, debug the antenna to improve the efficiency, such that TIS can be improved; and the other way is to, when the efficiency of the antenna is fixed, decrease link insertion loss, such that TIS can also be improved. Comparatively, after the antenna design is finalized, it is an easier and simpler measure to decrease the insertion loss of the radio frequency receiving link. On the premise that the conducted power and receiving sensitivity specified by 3GPP are reached, products with higher TRP and TIS can improve the transmitting power of the transmitting link and the receiving sensitivity of the receiving link.

SUMMARY OF THE INVENTION

In view of this, the embodiment of the present document is expected to provide a device, a mobile terminal, a method and a storage medium for improving receiving and transmitting performance of a radio frequency link to improve the transmitting power and receiving sensitivity of the mobile terminal.

In order to achieve the purpose, the technical scheme of the embodiment of the present document is realized as follows.

The embodiment of the present document provides a device for improving receiving and transmitting performance of a radio frequency link, comprising:

a radio frequency transmitting link configured to transmit a signal, a radio frequency receiving link configured to receive a signal transmitted by a base station and a test link configured to test the radio frequency transmitting link and the radio frequency receiving link, wherein, a first node is set between a power amplifier and a contact spring of a first antenna in the radio frequency transmitting link, the first node is connected to a first on-off port of a radio frequency main switch in the test link;

a second node is set between a receiving filter and a contact spring of a second antenna in the radio frequency receiving link, the second node is connected to a third on-off port of the radio frequency main switch in the test link; and a second on-off port of the radio frequency main switch in the test link is connected to ground via a resistor.

Preferably, the radio frequency transmitting link further comprises a baseband chip, a radio frequency transmitting and receiving chip, a transmitting filter and a transmitting antenna; and the baseband chip is interconnected to the radio frequency transmitting and receiving chip, an output of the radio frequency transmitting and receiving chip is connected to the transmitting filter, and the transmitting filter is connected to the transmitting antenna through the power amplifier.

Preferably, the radio frequency receiving link further comprises a receiving antenna, a radio frequency transmitting and receiving chip and a baseband chip; the baseband chip is interconnected to the radio frequency transmitting and receiving chip, and an output of the receiving filter is connected to the radio frequency transmitting and receiving chip; and the receiving antenna is connected to the receiving filter.

Preferably, the test link further comprises a baseband chip and a radio frequency test socket; wherein the radio frequency test socket is set between the radio frequency main switch and the baseband chip.

The embodiment of the present document further provides a test device for improving receiving and transmitting performance of a radio frequency link, comprising:

a radio frequency transmitting link configured to transmit a test signal, a radio frequency receiving link configured to receive the test signal, a test link configured to test a radio frequency transmitting link and a radio frequency receiving link, and a power supply circuit configured to supply power to the test device, wherein, a power amplifier in the radio frequency transmitting link is connected to a first on-off port of a radio frequency main switch in the test link;

a receiving filter in the radio frequency receiving link is connected to a third on-off port of the radio frequency main switch in the test link; and a second on-off port of the radio frequency main switch in the test link is connected to ground through a resistor.

Preferably, the radio frequency transmitting link further comprises a baseband chip, a radio frequency transmitting and receiving chip and a transmitting filter; and the baseband chip is interconnected to the radio frequency transmitting and receiving chip, an output of the radio frequency transceiver chip is connected to the transmitting filter and the transmitting filter is connected to the power amplifier.

Preferably, the radio frequency receiving link further comprises a radio frequency transceiver chip and a baseband chip; and the baseband chip is interconnected to the radio frequency transceiver chip and an output of the receiving filter is connected to the radio frequency transceiver chip.

Preferably, the test link is used for testing the radio frequency transmitting link and the radio frequency receiving link; the test link further comprises a comprehensive tester, a baseband chip and a radio frequency test socket; and the radio frequency test socket is arranged between the radio frequency main switch and the baseband chip, and the comprehensive tester is connected to the radio frequency test socket.

Preferably, the power supply circuit comprises a base, a test power supply contact and a Micro-USB socket; or a base, a Micro-USB socket and a Micro-USB connecting line.

The embodiment of the present document further provides a mobile terminal for improving receiving and transmitting performance of a radio frequency link, characterized in that, the mobile terminal comprises any one of the above devices for improving receiving and transmitting performance of a radio frequency link; or the mobile terminal comprises any one of the above test devices for improving receiving and transmitting performance of a radio frequency link.

The embodiment of the present document further provides a method for improving receiving and transmitting performance of a radio frequency link, wherein a first on-off port of a radio frequency main switch in a test link is connected to a first node between a power amplifier and a contact spring of a first antenna in the radio frequency transmitting link, a third on-off port of the radio frequency main switch in the test link is connected to a second node between a receiving filter and a contact spring of a second antenna in the radio frequency receiving link, and a second on-off port of the radio frequency main switch in the test link is connected to ground via a resistor; and during application, the method further comprises:

modulating, by a radio frequency transmitting and receiving chip, a baseband signal output by a baseband chip to a high-frequency carrier signal, after the high-frequency carrier signal is filtered by a transmitting filter and amplified by the power amplifier, transmitting the high-frequency carrier signal, to a transmitting antenna through a contact spring of a first antenna; and transmitting, by a receiving antenna, a signal transmitted by a base station to the receiving filter through the contact spring of the second antenna, after the signal is filtered by the receiving filter and demodulated by the radio frequency transceiver chip, transmitting the signal to the baseband chip.

The embodiment of the present document further provides a test method for improving receiving and transmitting performance of a radio frequency link, wherein a first on-off port of a radio frequency main switch in a test link is connected to a power amplifier in a radio frequency transmitting link, a third on-off port of the radio frequency main switch in the test link is connected to a receiving filter in a radio frequency receiving link, and a second on-off port of the radio frequency main switch in the test link is connected to ground via a resistor; and the method further:

transmitting, by a baseband chip, a transmitting link calibration instruction, and controlling the radio frequency main switch to connect a common end with the first on-off port to make the power amplifier to be connected to a radio frequency test socket; and transmitting, by the baseband chip, a receiving link calibration instruction, and controlling the radio frequency main switch to connect the common end with the third on-off port to make the receiving filter to be connected to the radio frequency test socket.

Preferably, before transmitting, by the baseband chip, the calibration instruction, the method further comprises: judging, by the baseband chip, whether the radio frequency link is in a calibration state; and said judging, by the baseband chip, whether the radio frequency link is in the calibration state or not comprises:

after the radio frequency link completes power supply and self-check, controlling, by the baseband chip, to connect the common end with the second on-off port of the radio frequency main switch, wherein the radio frequency test socket is connected to the ground through the radio frequency main switch and the resistor, and the baseband chip can detect the existence of the resistor; and after a radio frequency coaxial wire is connected to the radio frequency test socket, the radio frequency coaxial wire being connected the with the radio frequency main switch through the radio frequency test socket, when the baseband chip cannot detect the existence of the resistor, the baseband chip judging that the radio frequency link is in the calibration state.

Preferably, after the power amplifier is connected to the radio frequency test socket, the method further comprises:

modulating, by a radio frequency transmitting and receiving chip, a baseband signal output by the baseband chip to a high-frequency carrier signal, respectively filtering and amplifying the high-frequency carrier signal through a transmitting filter and the power amplifier, and transmitting the high-frequency carrier signal to a comprehensive tester through the radio frequency test socket.

Preferably, after the receiving filter is connected to the radio frequency test socket, the method further comprises:

transmitting the signal transmitted by the comprehensive tester to the receiving filter through the radio frequency test socket; after the signal is filtered through the receiving filter and demodulated by the radio frequency transmitting and receiving chip, and then transmitting the signal to the baseband chip.

The embodiment of the present document further provides a computer storage medium, wherein the computer storage medium stores a computer program, and the computer program is used for executing the above method for improving receiving and transmitting performance of a radio frequency link provided by the embodiment of the present document and/or the above test method for improving receiving and transmitting performance of a radio frequency link provided by the embodiment of the present document.

The device, the mobile terminal, the method and the storage medium for improving receiving and transmitting performance of a radio frequency link provided by the embodiments of the present document do not use the radio frequency main switch, the radio frequency test socket and the corresponding matching network on the radio frequency transmitting link and the radio frequency receiving link, thus the insertion losses of the radio frequency transmitting link and the radio frequency receiving link can be obviously reduced, and the transmitting performance and receiving performance of the radio frequency link are effectively improved.

In one embodiment of the present document, by arranging the first node between the power amplifier and the contact spring of the first antenna of the radio frequency transmitting link, connecting the first node with the first on-off port of the radio frequency main switch in the test link, arranging the second node between the receiving filter and the contact spring of the second antenna in the radio frequency receiving link and connecting the second node with the third on-off port of the radio frequency main switch in the test link, the transmitting power and receiving sensitivity of the mobile terminal can be improved during application.

In another embodiment of the present document, by connecting the first on-off port of the radio frequency main switch in the test link with the power amplifier in the radio frequency transmitting link, connecting the third on-off port of the radio frequency main switch in the test link with the receiving filter in the radio frequency receiving link, connecting the second on-off port of the radio frequency main switch in the test link with the ground through the resistor and controlling the common end of the radio frequency main switch to be connected to the first on-off port or the second on-off port during test, the test for the radio frequency transmitting link or the test for the radio frequency receiving link can be realized.

PREFERRED EMBODIMENTS OF THE PRESENT DOCUMENT

Figure 1:
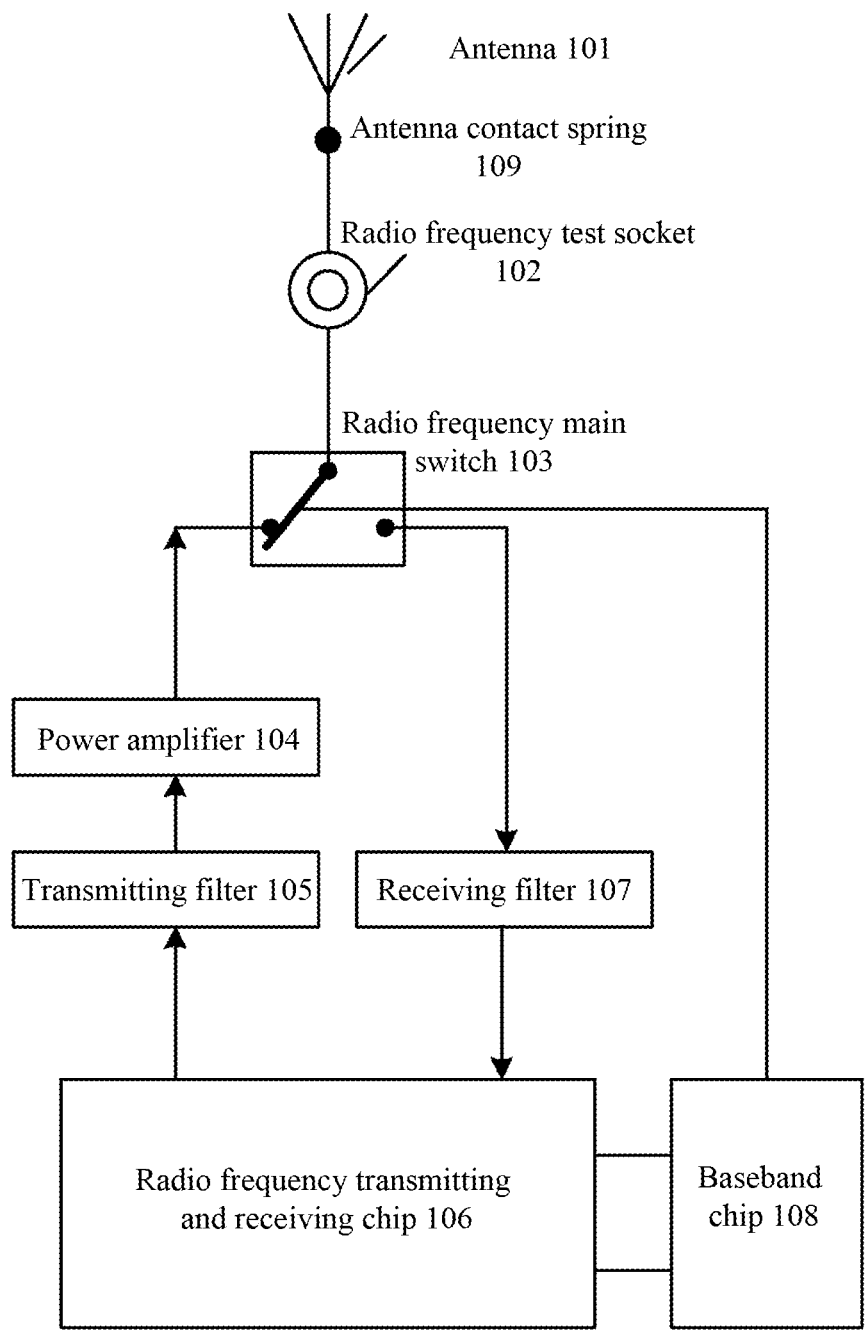
FIG. 1 is a schematic diagram of a component structure of a radio frequency link.

FIG. 1 shows a component structure of a radio frequency link for a TD-LTE mode. As shown in FIG. 1, the radio frequency link includes a radio frequency transmitting link and a radio frequency receiving link.

The radio frequency transmitting link includes a baseband chip 108, a radio frequency transmitting and receiving chip 106, a transmitting filter 105, a power amplifier 104, a radio frequency main switch 103, a radio frequency test socket 102, an antenna contact spring 109 and the antenna 101. When a signal is transmitted, the radio frequency transmitting and receiving chip 106 modulates a baseband signal output by the baseband chip 108 to a high-frequency carrier signal and transmits the high-frequency carrier signal to the transmitting filter 105. The transmitting filter 105 filters the received high-frequency carrier signal and then transmits the high-frequency carrier signal to the power amplifier 104. The power amplifier 104 amplifies the received high-frequency carrier signal and then transmits the high-frequency carrier signal to the antenna 101 through the radio frequency main switch 103, the radio frequency test socket 102 and the antenna contact spring 109, to communicate with a base station.

The radio frequency receiving link includes the antenna 101, the antenna contact spring 109, a radio frequency test socket 102, a radio frequency main switch 103, a receiving filter 107, a radio frequency transmitting and receiving chip 106 and a baseband chip 109; when the signal is received, the antenna 101 transmits the received signal transmitted by the base station to the receiving filter 107 through the radio frequency test socket 102 and the radio frequency main switch 103. The receiving filter 107 filters the received signal and transmits the signal to the radio frequency transmitting and receiving chip 106; and the radio frequency transmitting and receiving chip 106 demodulates the received signal and transmits the demodulated signal to the baseband chip 108 to perform information processing.

In the radio frequency link structure for the TD-LTE mode as shown in FIG. 1, for the transmitting link, from the power amplifier 104 to the antenna contact spring 109, the signal needs to pass through the radio frequency main switch 103 and the radio frequency test socket 102. Based on the current design and manufacturing process level, from low frequency to high frequency, the radio frequency main switch has an insertion loss of 0.6-1.5 dB, and from low frequency to high frequency, the radio frequency test socket has an insertion loss of 0.2-0.3 dB; if a high-power transmitting filter and a corresponding radio frequency matching link are added in the transmitting link, an additional insertion loss of 1-1.5 dB will be increased in the transmitting link; thus, from an output port of the power amplifier 104 to the antenna contact spring 109, an insertion loss of 1.8-3.3 dB will be increased; at present, the maximum usable output power of the power amplifier 104 adopted by the mobile terminal is 27-29 dBm, the power arriving at the antenna contact spring 109 is only 23.7-27.2 dBm and is not very high; and moreover, the power amplifier has already been close to a state of maximum output power, it is difficult to effectively reduce heat and power loss, and this is not beneficial to the improvement of the reliability design of the product.

In order to solve the above-mentioned problem, in the embodiment of the present document, the power amplifier and the contact spring of the first antenna in the radio frequency transmitting link are connected to the first on-off port of the radio frequency main switch in a test link through a first node, and the receiving filter and the contact spring of second antenna in the radio frequency receiving link are connected to the third on-off port of the radio frequency main switch in the test link through a second node; and during test, a common end of the radio frequency main switch is controlled to be connected to the first on-off port or the second on-off port; and the radio frequency main switch, the radio frequency test and the corresponding matching network are not used in the radio frequency transmitting link and the radio frequency receiving link.

Specifically, during signal transmission, the radio frequency transmitting and receiving chip modulates a baseband signal output by the baseband chip to a high-frequency carrier signal, the high-frequency carrier signal is respectively filtered and amplified by the transmitting filter and the power amplifier, and then the high-frequency carrier signal is transmitted to the transmitting antenna through the contact spring of first antenna; and in the radio frequency transmitting link, the radio frequency main switch and the radio frequency test socket are not used and thus the insertion loss of the transmitting link can be effectively reduced.

Specifically, when the signal is received, the receiving antenna transmits the signal transmitted by the base station to the receiving filter through the contact spring of the second antenna, the signal is respectively filtered and demodulated by the receiving filter and the radio frequency transmitting and receiving chip and then the signal is transmitted to the baseband chip; and in the radio frequency receiving link, the radio frequency main switch and the radio frequency test socket are not used and thus the insertion loss of the transmitting link can be effectively reduced.

In the embodiment of the present document, the first on-off port of the radio frequency main switch is connected to the first node between the power amplifier and the contact spring of first antenna in the radio frequency transmitting link, and the third on-off port of the radio frequency main switch is connected to the second node between the receiving filter and the contact spring of second antenna in the radio frequency receiving link; during radio frequency transmitting link test, the baseband chip transmits a transmitting link calibration instruction to control the radio frequency main switch to connect the common end and the first on-off port such that the power amplifier is connected to the radio frequency test socket; and during radio frequency receiving link test, the baseband chip transmits a receiving link calibration instruction to control the radio frequency main switch to connect the common end and the third on-off port such that the receiving filter is connected to the radio frequency test socket.

It should be stated that the receiving antenna and the transmitting antenna in the embodiment of the present document can be separable antennas such as an Inverted F-Antenna (IFA), Planar Inverted F-Antennas (PIFA) and Laser Direct Structuring (LDS) antenna.

The technical scheme of the embodiment of the present document will be further described below in details in combination with the drawings and the specific embodiments.

Figure 2:
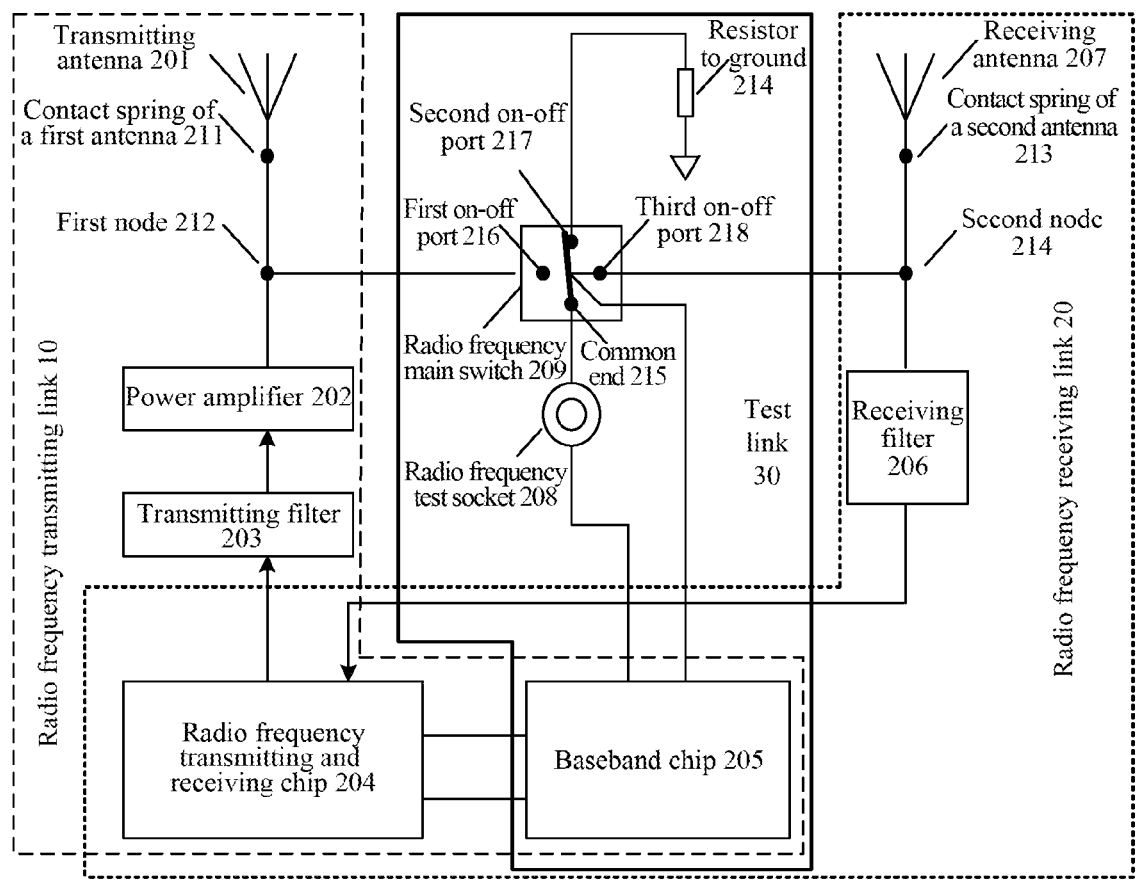
FIG. 2 is a schematic diagram of a component structure of a device for improving receiving and transmitting performance of a radio frequency link provided by the embodiment of the present document.

The embodiment of the present document provides a device for improving receiving and transmitting performance of a radio frequency link. As shown in FIG. 2, the device includes a radio frequency transmitting link 10, a radio frequency receiving link 20 and a test link 30.

A first node 212 is set between a power amplifier 202 and a contact spring of first antenna 211 in the radio frequency transmitting link 10, and the first node 212 is connected to a first on-off port 216 of a radio frequency main switch 209 in the test link 30;

a second node 214 is set between a receiving filter 206 and a contact spring of second antenna 213 in the radio frequency receiving link 20, and the second node 214 is connected to a third on-off port 218 of the radio frequency main switch 209 in the test link 30; and a second on-off port 217 of the radio frequency main switch 209 in the test link 30 is connected to ground via a resistor 214.

Specifically, the radio frequency transmitting link 10 is configured to transmit a signal; the radio frequency transmitting link 10 further includes a baseband chip 205, a radio frequency transmitting and receiving chip 204, a transmitting filter 203 and a transmitting antenna 201; and the baseband chip 205 is interconnected to the radio frequency transmitting and receiving chip 204, an output of the radio frequency transmitting and receiving chip 204 is connected to the transmitting filter 203 and the transmitting filter 203 is connected to the transmitting antenna 201 through the power amplifier 202.

The radio frequency receiving link 20 is configured to receive a signal transmitted by a base station; the radio frequency receiving link 20 further includes a receiving antenna 207, a radio frequency transmitting and receiving chip 204 and a baseband chip 205; the baseband chip 205 is interconnected to the radio frequency transmitting and receiving chip 204, and an output of the receiving filter 203 is connected to the radio frequency transmitting and receiving chip 204; and the receiving antenna 207 is connected to the receiving filter 203.

The test link 30 is configured to test the radio frequency transmitting link 10 and the radio frequency receiving link 20; the test link 30 further includes a baseband chip 204 and a radio frequency test socket 208; and the radio frequency test socket 208 is set between the radio frequency main switch 209 and the baseband chip 204.

Figure 3:
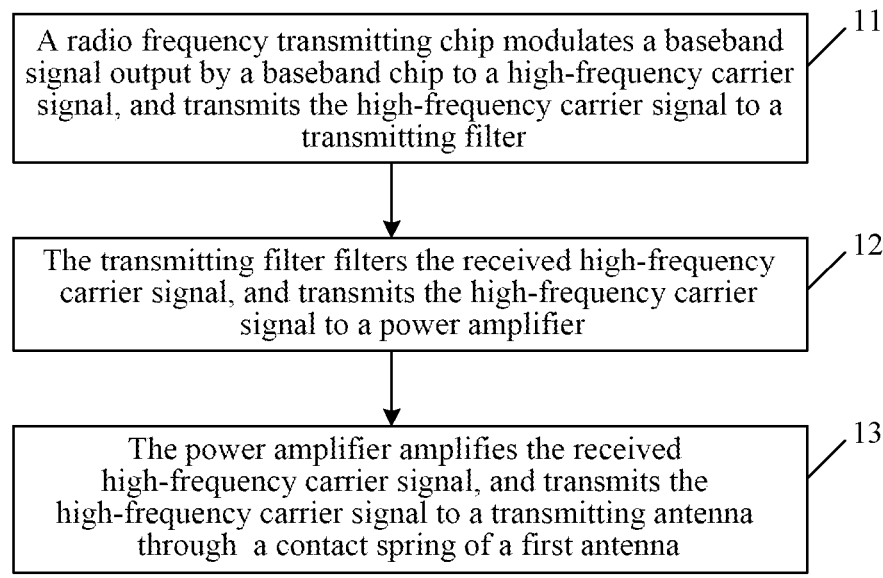
FIG. 3 is an implementation flowchart of a method for improving receiving and transmitting performance of a radio frequency link when a signal is transmitted provided by the embodiment of the present document.

Based on the device for improving the receiving and transmitting performance of the radio frequency link as shown in FIG. 2, the embodiment of the present document provides a method for improving receiving and transmitting performance of a radio frequency link. As shown in FIG. 3, when a signal is transmitted, the method includes the following steps.

In step 11: a radio frequency transmitting and receiving chip modulates a baseband signal output by a baseband chip to a high-frequency carrier signal, and transmits the high-frequency carrier signal to a transmitting filter.

In step 12: the transmitting filter filters the received high-frequency carrier signal, and then transmits the high-frequency carrier signal to a power amplifier.

In step 13: the power amplifier amplifies the received high-frequency carrier signal, and then transmits the high-frequency carrier signal to a transmitting antenna through a contact spring of first antenna.

Figure 4:
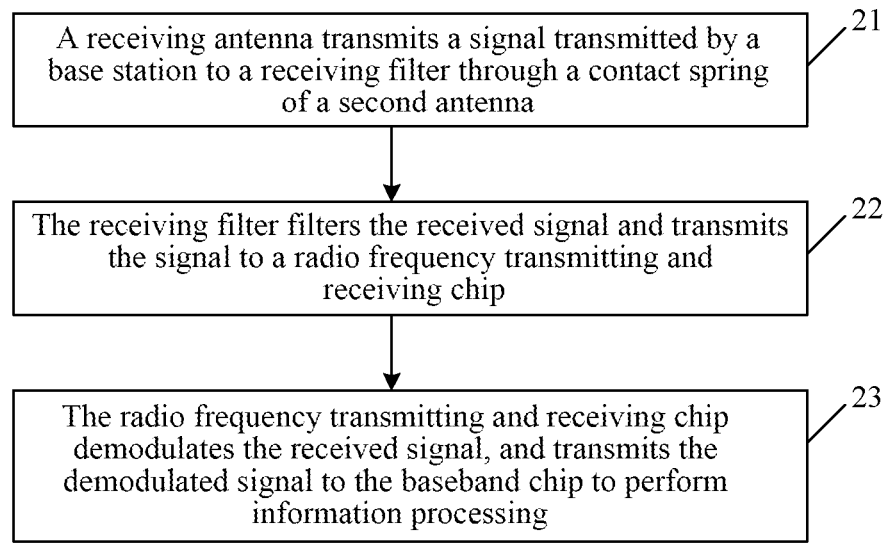
FIG. 4 is an implementation flowchart of a method for improving receiving and transmitting performance of a radio frequency link when a signal is received provided by the embodiment of the present document.

Based on the device for improving the receiving and transmitting performance of the radio frequency link as shown in FIG. 2, the embodiment of the present document provides a method for improving receiving and transmitting performance of a radio frequency link. As shown in FIG. 4, when the signal is received, the method includes the following steps:

In step 21: a receiving antenna transmits a signal transmitted by a base station to a receiving filter through a contact spring of second antenna.

In step 22: the receiving filter filters the received signal and then transmits the signal to a radio frequency transmitting and receiving chip.

In step 23: the radio frequency transmitting and receiving chip demodulates the received signal, and transmits the demodulated signal to the baseband chip to perform subsequent information processing.

Figure 5:
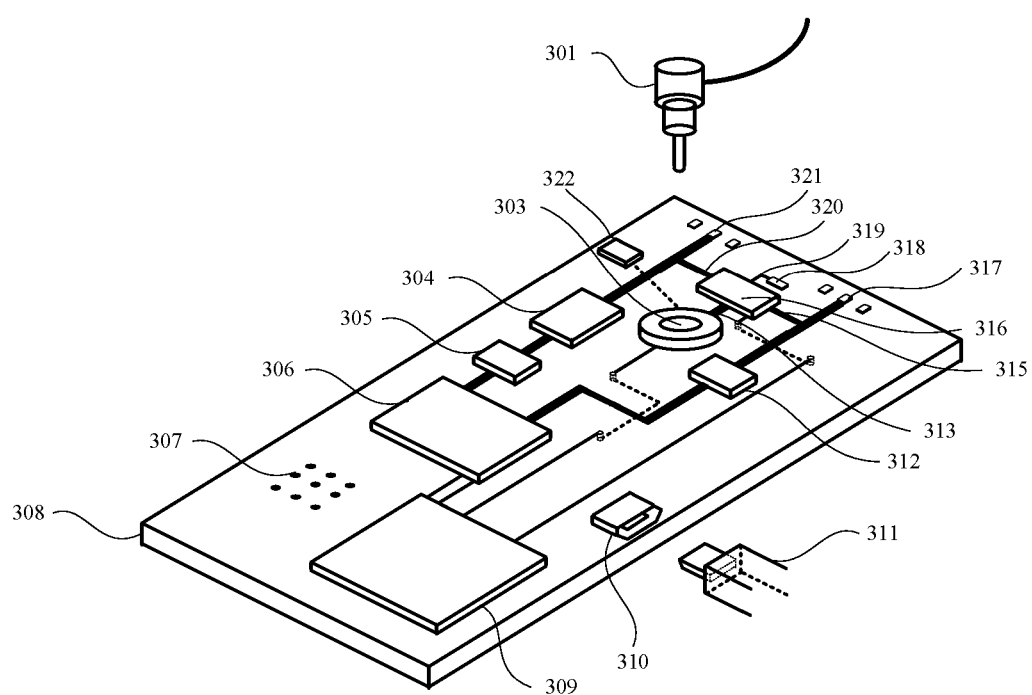
FIG. 5 is a schematic diagram of a component structure of a test device for improving receiving and transmitting performance of a radio frequency link provided by the embodiment of the present document.

The embodiment of the present document further provides a test device for improving receiving and transmitting performance of a radio frequency link. As shown in FIG. 5, the device includes a signal transmitting portion configured to transmit a test signal, a signal receiving portion configured to receive the test signal, a signal test portion configured to test the signal transmitting portion and the signal receiving portion, and a power supply portion configured to supply power for the test device.

A power amplifier 304 in the signal transmitting portion is connected to a first on-off port 320 of a radio frequency main switch 316 in the signal test portion; a receiving filter 312 in the signal receiving portion is connected to a third on-off port 315 of the radio frequency main switch 316 in the test link; a second on-off port 319 of the radio frequency main switch 316 in the signal test portion is connected to a ground through a resistor 318; and resistance of the resistor 318 is 50Ω.

Specifically, the signal transmitting portion further includes a baseband chip 309, a radio frequency transmitting and receiving chip 306 and a transmitting filter 305; and the baseband chip 309 is interconnected to the radio frequency transmitting and receiving chip 306, an output of the radio frequency transmitting and receiving chip 306 is connected to the transmitting filter 305 and the transmitting filter 305 is connected to the power amplifier 304.

The signal receiving portion further includes a radio frequency transmitting and receiving chip 306 and a baseband chip 309; and the baseband chip 309 is interconnected to the radio frequency transmitting and receiving chip 306 and an output of the receiving filter 312 is connected to the radio frequency transmitting and receiving chip 306.

The signal test portion further includes a comprehensive tester 322, a baseband chip 309 and a radio frequency test socket 303; and the radio frequency test socket 303 is arranged between the radio frequency main switch 316 and the baseband chip 309, and the comprehensive tester 322 is connected to the radio frequency test socket 303.

The power supply portion includes a base 308, a test power supply contact 307 and a Micro-USB socket 310, or the power supply portion includes or a base 308, a Micro-USB socket 310 and a Micro-USB connecting line 311; and the power supply portion is further configured to connect an external test device to a diagnosis port of the test device for improving the receiving and transmitting performance of the radio frequency.

Figure 6:
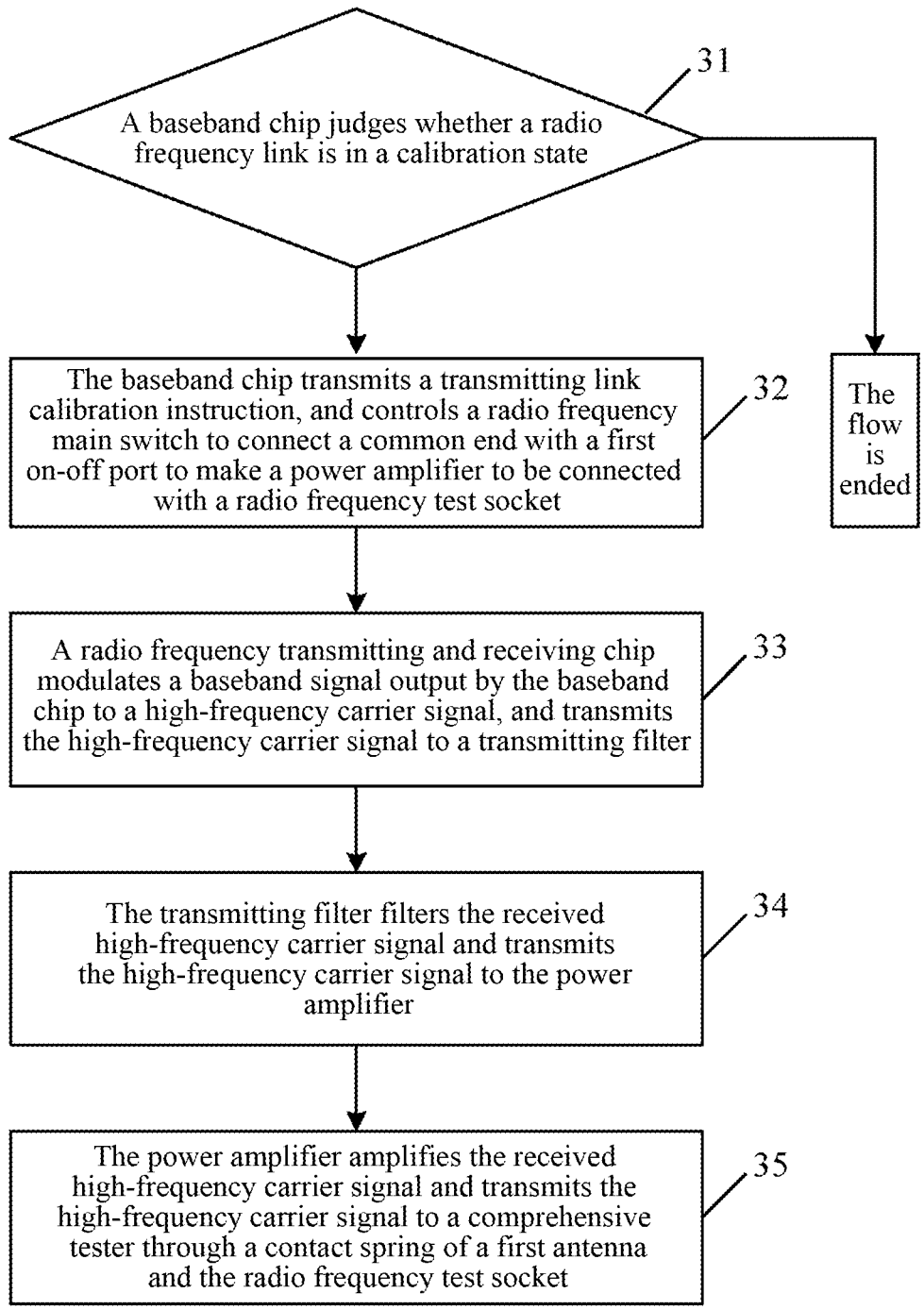
FIG. 6 is an implementation flowchart during radio of a test method for improving radio frequency link receiving and transmitting performance when a radio frequency transmitting link is tested provided by the embodiment of the present document.
Figure 7:
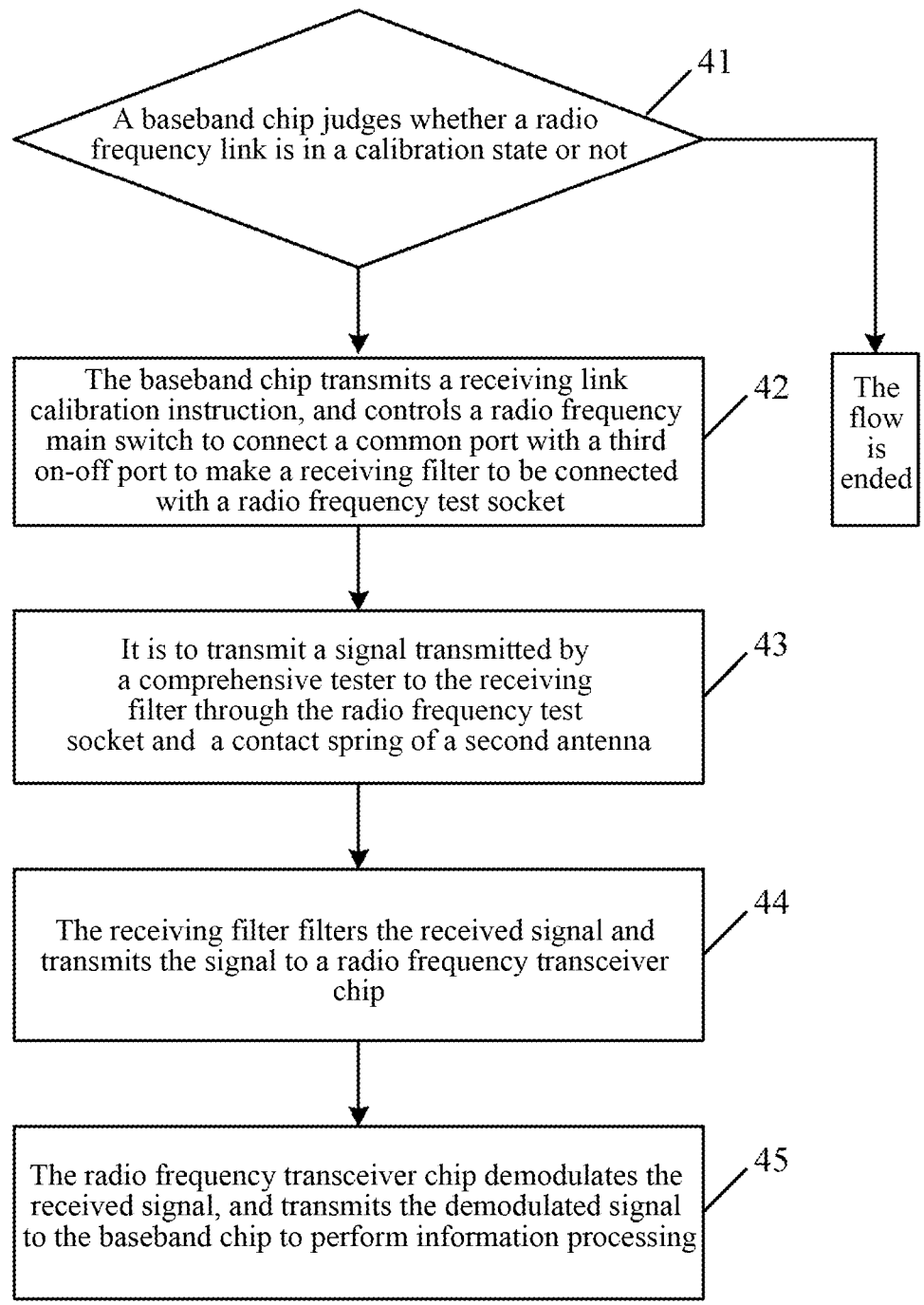
FIG. 7 is an implementation flowchart a test method for improving receiving and transmitting performance of a radio frequency link when a radio frequency receiving link is tested provided by the embodiment of the present document.

Based on the test device for improving receiving and transmitting performance of a radio frequency link as shown in FIG. 5, the embodiment of the present document provides a test method for improving receiving and transmitting performance of a radio frequency link. A first on-off port 320 of a radio frequency main switch 316 in a signal test portion is connected to a power amplifier 304 in a signal transmitting portion, a third on-off port 315 of the radio frequency main switch 316 in the signal test portion is connected to a receiving filter 312 in a signal receiving portion, and a second on-off port 319 of the radio frequency main switch 316 in the signal test portion is connected to ground via a resistor 318; and a radio frequency test socket 303 is connected to a comprehensive tester 322. As shown in FIG. 6, when the radio frequency transmitting link is tested, the method includes the following steps.

Instep 31: a baseband chip judges whether a radio frequency link is in a calibration state or not; if yes, it is to proceed to step 32; and if not, it is to end the flow.

Specifically, after the test device for improving the receiving and transmitting performance of the radio frequency link completes power supply and self-check, the baseband chip controls a common end and the second on-off port of the radio frequency main switch to be connected, the radio test seat is connected to the ground through the radio frequency main switch and the resistor at this moment, and the baseband chip can detect the existence of the resistor.

After a radio frequency coaxial wire is connected to the radio frequency test socket, the radio frequency coaxial wire is connected to the radio frequency main switch through the radio frequency test socket, the baseband chip cannot detect the existence of the resistor, and that the radio frequency link is in the calibration state is judged.

Therein, the step of supplying power to the test device for improving the receiving and transmitting performance of the radio frequency link includes: supplying power to the test device for improving the receiving and transmitting performance of radio frequency link through a test power supply contact, and connecting a test computer with a diagnosis port of the test device for improving the receiving and transmitting performance of the radio frequency link through a Micro-USB socket; or connecting a Micro-USB connecting line only with a Micro-USB socket in the test device for improving the receiving and transmitting performance of the radio frequency link in a manual test, supplying power for the test device for improving the receiving and transmitting performance of the radio frequency link, and connecting an external test device with a diagnosis port of the test device for improving the receiving and transmitting performance of the radio frequency link.

In step 32: the baseband chip transmits, a transmitting link calibration instruction, and controls a radio frequency main switch to connect a common end with a first on-off port such that a power amplifier is connected to a radio frequency test socket.

In step 33: a radio frequency transmitting and receiving chip, modulates a baseband signal output by the baseband chip to a high-frequency carrier signal, and transmits the high-frequency carrier signal to a transmitting filter.

In step 34: the transmitting filter filters the received high-frequency carrier signal and then transmits the high-frequency carrier signal to the power amplifier.

In step 35: the power amplifier amplifies the received high-frequency carrier signal and transmits the high-frequency carrier signal to a comprehensive tester through the radio frequency test socket.

Based on the test device for improving the receiving and transmitting performance of the radio frequency link as shown in FIG. 5, the embodiment of the present document provides a test method for improving receiving and transmitting performance of a radio frequency link. A first on-off port 320 of a radio frequency main switch 316 in a signal test portion is connected to a power amplifier 304 in a signal transmitting portion, a third on-off port 315 of the radio frequency main switch 316 in the signal test portion is connected to a receiving filter 312 in a signal receiving portion, and a second on-off port 319 of the radio frequency main switch 316 in the signal test portion is connected to ground via a resistor 318; and a radio frequency test socket 303 is connected to a comprehensive tester 322. As shown in FIG. 6, when the radio frequency transmitting link is tested, the method includes the following steps.

In step 41: a baseband chip judges whether a radio frequency link is in a calibration state or not; if yes, it is to proceed to step 32; and if not, it is to end the flow.

Specifically, after the test device for improving radio frequency receiving and transmitting performance completes power supply and self-check, the baseband chip controls a common end and the second on-off port of the radio frequency main switch to be connected, the radio test seat is connected to the ground through the radio frequency main switch and the resistor at this moment, and the baseband chip can detect the existence of the resistor.

After a radio frequency coaxial wire is connected to the radio frequency test socket, the radio frequency coaxial wire is connected to the radio frequency main switch through the radio frequency test socket, the baseband chip cannot detect the existence of the resistor, and that the radio frequency link is in the calibration state is judged.

Therein, the step of supplying power to the test device for improving the receiving and transmitting performance of the radio frequency link includes: supplying power to the test device for improving the receiving and transmitting performance of the radio frequency link through a test power supply contact, and connecting a test computer with a diagnosis port of the test device for improving the receiving and transmitting performance of the radio frequency link through a Micro-USB socket; or connecting a Micro-USB connecting line only with a Micro-USB socket in the test device for improving the receiving and transmitting performance of the radio frequency link in a manual test, supplying power for the test device for improving the receiving and transmitting performance of the radio frequency link, and connecting an external test device with a diagnosis port of the test device for improving the receiving and transmitting performance of the radio frequency link.

In step 42: the baseband chip transmits a receiving link calibration instruction, and controls a radio frequency main switch to connect a common end with a third on-off port to make a receiving filter to be connected to a radio frequency test socket.

In step 43: a signal transmitted by a comprehensive tester is transmitted to the receiving filter through the radio frequency test socket.

In step 44: the receiving filter filters the received signal and then transmits the signal to a radio frequency transmitting and receiving chip.

In step 45: the radio frequency transmitting and receiving chip demodulates the received signal, and transmits the demodulated signal to the baseband chip to perform information processing.

Figure 8:
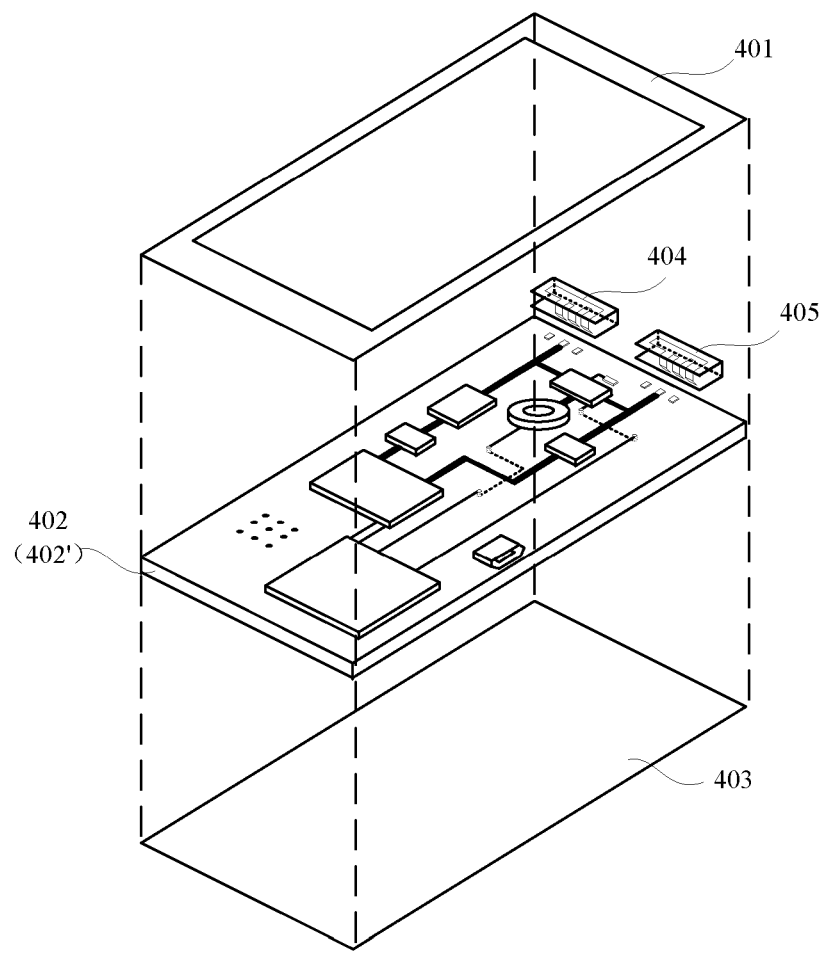
FIG. 8 is a schematic diagram of a component structure of a mobile terminal for improving receiving and transmitting performance of a radio frequency link provided by the embodiment of the present document.

The embodiment of the present document provides a mobile terminal for improving receiving and transmitting performance of a radio frequency link. As shown in FIG. 8, the mobile terminal includes a mobile terminal front shell 401, a mobile terminal rear shell 403, a device 402 for improving receiving and transmitting performance of a radio frequency link, a transmitting antenna 404 and a receiving antenna 405. The device 402 for improving the receiving and transmitting performance of the radio frequency link is the device as shown in FIG. 2; or the mobile terminal includes a mobile terminal front shell 401, a mobile terminal rear shell 403, a device 402' for improving radio frequency link receiving and transmitting performance, a transmitting antenna 404 and a receiving antenna 405. The device 402' for improving the receiving and transmitting performance of the radio frequency link is the device as shown in FIG. 5.

In the embodiments of the present document, if the method for improving the receiving and transmitting performance of the radio frequency link and/or the test method for improving the receiving and transmitting performance of the radio frequency link are implemented by means of software function modules and are sold or used as independent products, the method and/or the test method can be stored in a computer readable storage medium. Based on such understanding, the technical scheme of the embodiment of the present document substantially or the portion which makes a contribution to the prior art can be reflected by means of software product, the computer software product is stored in a storage medium and includes a plurality of instructions which enable a computer device (which can be a personal computer, a server or a network device) to execute all or partial steps of the method provided by each embodiment of the present document. The foresaid storage medium includes various mediums capable of storing program codes, such as a USB flash disk, a mobile hard disk, an ROM (Read Only Memory), a magnetic disk or a compact disk. Therefore, the embodiments of the present document are not limited by any specific combination of hardware and software.

Correspondingly, the embodiment of the present document further provides a computer storage medium, the computer storage medium stores a computer program, the computer program is used for executing the method for improving the receiving and transmitting performance of the radio frequency link provided by the embodiment of the present document and/or the test method for improving radio frequency link receiving and transmitting performance provided by the embodiment of the present document.

The above-mentioned embodiments are only preferred embodiments of the present document and are not used for limiting the protection scope of the present document.

What is claimed is:

1. A device for improving receiving and transmitting performance of a radio frequency link, the device comprising a radio frequency transmitting link configured to transmit a signal, a radio frequency receiving link configured to receive a signal transmitted by a base station and a test link configured to test the radio frequency transmitting link and the radio frequency receiving link, wherein,
   a first node is set between a power amplifier and a contact spring of a first antenna in the radio frequency transmitting link, and the first node is connected to a first on-off port of a radio frequency main switch in the test link;
   a second node is set between a receiving filter and a contact spring of a second antenna in the radio frequency receiving link, and the second node is connected to a third on-off port of the radio frequency main switch in the test link; and
   a second on-off port of the radio frequency main switch in the test link is connected to ground via a resistor.

2. The device for improving receiving and transmitting performance of a radio frequency link according to claim 1, wherein the radio frequency transmitting link further comprises a baseband chip, a radio frequency transmitting and receiving chip, a transmitting filter and a transmitting antenna; and the baseband chip is interconnected to the radio frequency transmitting and receiving chip, an output of the radio frequency transmitting and receiving chip is connected to the transmitting filter and the transmitting filter is connected to the transmitting antenna through the power amplifier.

3. The device for improving receiving and transmitting performance of a radio frequency link according to claim 1, wherein the radio frequency receiving link further comprises a receiving antenna, a radio frequency transmitting and receiving chip and a baseband chip; the baseband chip is interconnected to the radio frequency transmitting and receiving chip, and an output of the receiving filter is connected to the radio frequency transmitting and receiving chip; and the receiving antenna is connected to the receiving filter.

4. The device for improving receiving and transmitting performance of a radio frequency link according to claim 1, wherein the test link further comprises a baseband chip and a radio frequency test socket; and the radio frequency test socket is set between the radio frequency main switch and the baseband chip.

5. A mobile terminal for improving receiving and transmitting performance of a radio frequency link, the mobile terminal comprising the device for improving receiving and transmitting performance of a radio frequency link according to claim 1.

6. A test device for improving receiving and transmitting performance of a radio frequency link, the device comprising a radio frequency transmitting link configured to transmit a test signal, a radio frequency receiving link configured to receive the test signal, a test link configured to test the radio frequency transmitting link and the radio frequency receiving link, and a power supply circuit configured to supply power for the test device, wherein
   a power amplifier in the radio frequency transmitting link is connected to a first on-off port of a radio frequency main switch in the test link;
   a receiving filter in the radio frequency receiving link is connected to a third on-off port of the radio frequency main switch in the test link; and
   a second on-off port of the radio frequency main switch in the test link is connected to ground through a resistor.

7. The test device for improving receiving and transmitting performance of a radio frequency link according to claim 6, wherein the radio frequency transmitting link further comprises a baseband chip, a radio frequency transmitting and receiving chip and a transmitting filter; and the baseband chip is interconnected to the radio frequency transmitting and receiving chip, an output of the radio frequency transmitting and receiving chip is connected to the transmitting filter and the transmitting filter is connected to the power amplifier.

8. The test device for improving receiving and transmitting performance of a radio frequency link according to claim 6, wherein the radio frequency receiving link further comprises a radio frequency transmitting and receiving chip and a baseband chip; and the baseband chip is interconnected to the radio frequency transmitting and receiving chip and an output of the receiving filter is connected to the radio frequency transmitting and receiving chip.

9. The test device for improving receiving and transmitting performance of a radio frequency link according to claim 6, wherein the test link is used for testing the radio frequency transmitting link and the radio frequency receiving link; the test link further comprises a comprehensive tester, a baseband chip and a radio frequency test socket; and the radio frequency test socket is set between the radio frequency main switch and the baseband chip, and the comprehensive tester is connected to the radio frequency test socket.

10. The test device for improving receiving and transmitting performance of a radio frequency link according to claim 6, wherein the power supply circuit comprises:
   a base, a test power supply contact and a Micro-USB socket;
   or a base, a Micro-USB socket and a Micro-USB connecting line.

11. A mobile terminal for improving receiving and transmitting performance of a radio frequency link, the mobile terminal comprising the test device for improving receiving and transmitting performance of a radio frequency link according to claim 6.

12. A method for improving receiving and transmitting performance of a radio frequency link, a first on-off port of a radio frequency main switch in a test link connected to a first node between a power amplifier and a contact spring of a first antenna in a radio frequency transmitting link, a third on-off port of the radio frequency main switch in the test link connected to a second node between a receiving filter and a contact spring of a second antenna in a radio frequency receiving link, and a second on-off port of the radio frequency main switch in the test link connected to ground via a resistor; during application, the method further comprising:

modulating, by a radio frequency transmitting and receiving chip, a baseband signal output by a baseband chip to a high-frequency carrier signal, and after the high-frequency carrier signal is filtered by a transmitting filter and amplified by the power amplifier, and transmitting the high-frequency carrier signal to a transmitting antenna through a contact spring of a first antenna; and transmitting, by a receiving antenna, a signal transmitted by a base station to the receiving filter through a contact spring of a second antenna, and after the signal is filtered by the receiving filter and demodulated by the radio frequency transmitting and receiving chip, transmitting the signal to the baseband chip.

13. A non-transitory computer readable medium, wherein the non-transitory computer readable medium stores a computer executable instruction, and the computer executable instruction is used for executing the method for improving receiving and transmitting performance of a radio frequency link according to claim 12.

14. A test method for improving receiving and transmitting performance of a radio frequency link, wherein a first on-off port of a radio frequency main switch in a test link is connected to a power amplifier in a radio frequency transmitting link, a third on-off port of the radio frequency main switch in the test link is connected to a receiving filter in a radio frequency receiving link, and a second on-off port of the radio frequency main switch in the test link is connected to ground via a resistor; the method further comprises:

transmitting, by a baseband chip, a transmitting link calibration instruction, and controlling the radio frequency main switch to connect a common end with the first on-off port to make the power amplifier to be connected to a radio frequency test socket; and transmitting, by the baseband chip, a receiving link calibration instruction, and controlling the radio frequency main switch to connect the common end with the third on-off port to make the receiving filter to be connected to the radio frequency test socket.

15. The test method for improving receiving and transmitting performance of a radio frequency link according to claim 14, wherein before transmitting, by the baseband chip, the calibration instruction, the method further comprises:
judging, by the baseband chip, whether the radio frequency link is in a calibration state; and
judging, by the baseband chip, whether the radio frequency link is in the calibration state or not comprising:
after the radio frequency link completes power supply and self-check, controlling, by the baseband chip, the common end and the second on-off port of the radio frequency main switch to be connected, wherein the radio frequency test socket is connected to the ground through the radio frequency main switch and the resistor, and the baseband chip can detect the existence of the resistor; and
after a radio frequency coaxial wire is connected to the radio frequency test socket, connecting the radio frequency coaxial wire with the radio frequency main switch through the radio frequency test socket, when the baseband chip cannot detect the existence of the resistor, determining that the radio frequency link is in the calibration state.

16. The test method for improving receiving and transmitting performance of a radio frequency link according to claim 15, wherein after the power amplifier is connected to the radio frequency test socket, the method further comprises:
modulating, by a radio frequency transmitting and receiving chip, a baseband signal output by the baseband chip to a high-frequency carrier signal, and after the high-frequency carrier signal is filtered by a transmitting filter and amplified by the power amplifier, transmitting the high-frequency carrier signal to a comprehensive tester through the radio frequency test socket.

17. The test method for improving receiving and transmitting performance of a radio frequency link according to claim 15, wherein after the receiving filter is connected to the radio frequency test socket, the method further comprises:
transmitting a signal transmitted by the comprehensive tester to the receiving filter through the radio frequency test socket; and after the signal is filtered through the receiving filter and demodulated by the radio frequency transmitting and receiving chip, transmitting the signal to the baseband chip.

18. The test method for improving receiving and transmitting performance of a radio frequency link according to claim 14, wherein after the power amplifier is connected to the radio frequency test socket, the method further comprises:
modulating, by a radio frequency transmitting and receiving chip, a baseband signal output by the baseband chip to a high-frequency carrier signal, and after the high-frequency carrier signal is filtered by a transmitting filter and amplified by the power amplifier, transmitting the high-frequency carrier signal to a comprehensive tester through the radio frequency test socket.

19. The test method for improving receiving and transmitting performance of a radio frequency link according to claim 14, wherein after the receiving filter is connected to the radio frequency test socket, the method further comprises:
transmitting a signal transmitted by the comprehensive tester to the receiving filter through the radio frequency test socket; and after the signal is filtered through the receiving filter and demodulated by the radio frequency transmitting and receiving chip, transmitting the signal to the baseband chip.

20. A non-transitory computer readable medium, wherein the non-transitory computer readable medium stores a computer executable instruction, and the computer executable instruction is used for executing the test method for improving receiving and transmitting performance of a radio frequency link according to claim 14.

* * * * *